(12) United States Patent
Khan et al.

(10) Patent No.: US 12,725,423 B2
(45) Date of Patent: Sep. 1, 2026

(54) FRICTIONLESS AUTHENTICATION AND MONITORING

(71) Applicant: NCR Voyix Corporation, Atlanta, GA (US)

(72) Inventors: Sudip Rahman Khan, Decatur, GA (US); Matthew Robert Burris, Lawrenceville, GA (US); Christopher John Costello, Suwanee, GA (US); Gregory Joseph Hartl, Atlanta, GA (US)

(73) Assignee: NCR Voyix Corporation, Atlanta, GA (US)

( * ) Notice: Subject to any disclaimer, the term of this patent is extended or adjusted under 35 U.S.C. 154(b) by 0 days.

(21) Appl. No.: 18/623,778

(22) Filed: Apr. 1, 2024

(65) Prior Publication Data

US 2024/0331390 A1 Oct. 3, 2024

Related U.S. Application Data

(63) Continuation of application No. 17/690,285, filed on Mar. 9, 2022, now Pat. No. 11,948,365, which is a
(Continued)

(51) Int. Cl.
*G06V 20/52* (2022.01)
*G06F 16/74* (2019.01)
(Continued)

(52) U.S. Cl.
CPC ............ *G06V 20/53* (2022.01); *G06F 16/748* (2019.01); *G06F 16/784* (2019.01); *G06F 21/32* (2013.01);
(Continued)

(58) Field of Classification Search
None
See application file for complete search history.

(56) References Cited

U.S. PATENT DOCUMENTS

| | | | |
|---|---|---|---|
| 7,061,450 | B2 | 6/2006 | Bright et al. |
| 7,843,491 | B2 | 11/2010 | Vallone et al. |

(Continued)

FOREIGN PATENT DOCUMENTS

| | | | | | |
|---|---|---|---|---|---|
| AU | 2017201198 | A1 | | 3/2017 | |
| CA | 2835460 | C | * | 5/2018 | ............ G06F 21/32 |

(Continued)

OTHER PUBLICATIONS

Ball, Kirstie. “Workplace surveillance: An overview.” Labor History 51.1 (2010): 87-106. (Year: 2010).*

(Continued)

*Primary Examiner* — Thomas L Mansfield
(74) *Attorney, Agent, or Firm* — Schwegman Lundberg & Woessner, P.A.

(57) ABSTRACT

An identity of a customer within an establishment is authenticated using a variety of captured biometric features obtained from sensors and/or video. Video capturing movements/interactions of the customer is analyzed in real time to identify the customer’s behavior and actions. Any staff of the establishment who interact with the customer are identified from the video. Transaction data and other data retained for the customer by the establishment are aggregated and linked with the video and the customer identity. The linked data is analyzed in combination with the customer behavior and actions to determine responses within the establishment to customer-initiated transactions. In an embodiment, the customer is authorized to perform at least one transaction within the establishment based on the authenticated identity and linked data without a presentation by the customer of an
(Continued)

identification card, a Personal Identification Number (PIN), a password and/or verification by a staff member.

20 Claims, 4 Drawing Sheets

Related U.S. Application Data continuation of application No. 16/774,371, filed on Jan. 28, 2020, now Pat. No. 11,354,910, which is a continuation-in-part of application No. 16/724,560, filed on Dec. 23, 2019, now Pat. No. 11,238,554, and a continuation-in-part of application No. 16/696,837, filed on Nov. 26, 2019, now abandoned, and a continuation-in-part of application No. 16/586,203, filed on Sep. 27, 2019, now Pat. No. 11,501,301.

(51) Int. Cl.

| | |
|---|---|
| ***G06F 16/783*** | (2019.01) |
| ***G06F 21/32*** | (2013.01) |
| ***G06Q 20/40*** | (2012.01) |
| ***G06V 20/00*** | (2022.01) |
| ***G06V 40/20*** | (2022.01) |

(52) U.S. Cl.

CPC ... *G06Q 20/40145* (2013.01); *G06Q 20/4016* (2013.01); *G06V 20/35* (2022.01); *G06V 40/20* (2022.01)

(56) References Cited

U.S. PATENT DOCUMENTS 8,373,753 B2 2/2013 Cheng et al.
9,189,901 B2* 11/2015 Agrafioti ................. G06F 21/31
9,245,190 B2 1/2016 Rosenkrantz
10,181,082 B2 1/2019 Serre et al.
10,217,120 B1 2/2019 Shin et al.
10,346,675 B1 7/2019 Nagalla
10,476,873 B2* 11/2019 Turgeman ............. H04W 12/06
10,817,688 B1 10/2020 Ho et al.
11,538,126 B2* 12/2022 Vemury ............... G06Q 50/265
11,727,520 B2 8/2023 Burris et al.
2006/0004582 A1 1/2006 Claudatos
2006/0028556 A1 2/2006 Bunn et al.
2006/0171453 A1 8/2006 Rohlfing et al.
2008/0101658 A1 5/2008 Ahern
2010/0026802 A1 2/2010 Titus et al.
2011/0016052 A1 1/2011 Scragg
2011/0131122 A1 6/2011 Griffin et al.
2012/0078787 A1 3/2012 Mehew et al.
2013/0017812 A1 1/2013 Foster
2014/0067679 A1 3/2014 O'Reilly et al.
2014/0098235 A1 4/2014 Cusack, Jr.
2014/0125491 A1 5/2014 Park et al.
2014/0267735 A1 9/2014 Carey
2014/0331278 A1 11/2014 Tkachev
2014/0365304 A1 12/2014 Showers et al.
2015/0033305 A1 1/2015 Shear et al.
2015/0066764 A1 3/2015 Crowell et al.
2015/0326570 A1 11/2015 Publicover et al.
2016/0019514 A1 1/2016 Landers, Jr. et al.
2016/0035198 A1 2/2016 Coviello
2016/0048726 A1 2/2016 Tang et al.
2016/0189455 A1 6/2016 Lee et al.
2016/0224836 A1 8/2016 Appel et al.
2016/0253675 A1* 9/2016 Remillet ................. G06T 7/579 705/44
2016/0267759 A1 9/2016 Kerzner
2016/0301691 A1 10/2016 Miller et al.
2016/0308859 A1 10/2016 Barry et al.
2016/0364927 A1 12/2016 Barry et al.
2017/0027045 A1 1/2017 Chemel
2017/0286901 A1 10/2017 Skaff et al.
2018/0005176 A1* 1/2018 Williams ............. G06Q 10/087
2018/0176727 A1 6/2018 Williams
2018/0239953 A1 8/2018 Miwa
2018/0286901 A1 10/2018 Muramatsu et al.
2019/0180586 A1 6/2019 Script
2019/0220944 A1 7/2019 Vemury
2019/0260926 A1 8/2019 Kimball et al.
2019/0278981 A1* 9/2019 Wu ........................ G06V 40/10
2019/0354753 A1* 11/2019 Worrall .................. G06V 40/20
2019/0354774 A1 11/2019 Leizerovich et al.
2020/0013684 A1 1/2020 Soss et al.
2020/0136846 A1* 4/2020 Song ........................ G09G 5/10
2020/0257785 A1* 8/2020 Li ........................... G06F 21/32
2022/0076365 A1 3/2022 Burris et al.

FOREIGN PATENT DOCUMENTS

CN 108509029 B * 7/2021 ............. G06V 40/20
DE 10224916 A1 12/2003
EP 2633599 A2 9/2013
EP 3544005 A1 9/2019
EP 3547210 10/2019
JP 2019139570 A * 8/2019 ........... G06V 10/764
WO WO-2016016277 A1 2/2016
WO WO-2016065362 A1 4/2016

OTHER PUBLICATIONS

Ajunwa, Ifeoma, Kate Crawford, and Jason Schultz. "Limitless worker surveillance." Calif. L. Rev. 105 (2017): 735. (Year: 2017).*
Robertson, Michelle, et al. "The effects of an office ergonomics training and chair intervention on worker knowledge, behavior and musculoskeletal risk." Applied ergonomics 40.1 (2009): 124-135. (Year: 2009).*
Brémond, François, Monique Thonnat, and Marcos Zuniga. "Video-understanding framework for automatic behavior recognition." Behavior Research Methods 38.3 (2006): 416-426. (Year: 2006).*
Neves, João, et al. "Biometric recognition in surveillance scenarios: a survey." Artificial Intelligence Review 46.4 (2016): 515-541. (Year: 2016).*
"U.S. Appl. No. 16/586,203, Non Final Office Action mailed Mar. 25, 2022", 28 pgs.
"U.S. Appl. No. 16/586,203, Notice of Allowance mailed Jul. 27, 2022", 13 pgs.
"U.S. Appl. No. 16/586,203, Response filed Jun. 27, 2022 to Non Final Office Action mailed Mar. 25, 2022", 7 pgs.
"U.S. Appl. No. 16/696,837, Advisory Action mailed Feb. 15, 2023", 2 pgs.
"U.S. Appl. No. 16/696,837, Advisory Action mailed Feb. 15, 2024", 4 pgs.
"U.S. Appl. No. 16/696,837, Final Office Action mailed Jan. 24, 2022", 22 pgs.
"U.S. Appl. No. 16/696,837, Final Office Action mailed Nov. 1, 2023", 14 pgs.
"U.S. Appl. No. 16/696,837, Final Office Action mailed Nov. 28, 2022", 24 pgs.
"U.S. Appl. No. 16/696,837, Non Final Office Action mailed Jul. 13, 2023", 14 pgs.
"U.S. Appl. No. 16/696,837, Non Final Office Action mailed Aug. 17, 2022", 22 pgs.
"U.S. Appl. No. 16/696,837, Non Final Office Action mailed Sep. 17, 2021", 19 pgs.
"U.S. Appl. No. 16/696,837, Response filed Feb. 1, 2023 to Final Office Action mailed Nov. 28, 2022", 11 pgs.
"U.S. Appl. No. 16/696,837, Response filed Feb. 1, 2024 to Final Office Action mailed Nov. 1, 2023", 14 pgs.
"U.S. Appl. No. 16/696,837, Response filed Mar. 1, 2024 to Advisory Action mailed Feb. 15, 2024", 14 pgs.
"U.S. Appl. No. 16/696,837, Response filed Mar. 24, 2022 to Final Office Action mailed Jan. 24, 2022", 11 pgs.
"U.S. Appl. No. 16/696,837, Response filed Oct. 13, 2023 to Non Final Office Action mailed Jul. 13, 2023", 12 pgs.

(56) References Cited

OTHER PUBLICATIONS

"U.S. Appl. No. 16/696,837, Response filed Nov. 17, 2022 to Non Final Office Action mailed Aug. 17, 2022", 11 pgs.
"U.S. Appl. No. 16/696,837, Response filed Dec. 17, 2021 to Non Final Office Action mailed Sep. 17, 2021", 11 pgs.
"U.S. Appl. No. 16/696,870, Non Final Office Action mailed Jun. 30, 2021", 19 pgs.
"U.S. Appl. No. 16/696,870, Notice of Allowance mailed Jan. 5, 2022", 16 pgs.
"U.S. Appl. No. 16/696,870, Response filed Apr. 1, 2021 to Restriction Requirement mailed Feb. 2, 2021", 8 pgs.
"U.S. Appl. No. 16/696,870, Response filed Sep. 30, 2021 to Non Final Office Action mailed Jun. 30, 2021", 10 pgs.
"U.S. Appl. No. 16/696,870, Restriction Requirement mailed Feb. 2, 2021", 6 pgs.
"U.S. Appl. No. 16/724,560, Non Final Office Action mailed Mar. 25, 2021", 15 pgs.
"U.S. Appl. No. 16/724,560, Notice of Allowance mailed Sep. 29, 2021", 14 pgs.
"U.S. Appl. No. 16/724,560, Response filed Jun. 25, 2021 to Non Final Office Action mailed Mar. 25, 2021", 10 pgs.
"U.S. Appl. No. 16/774,331, Advisory Action mailed Feb. 23, 2022", 2 pgs.
"U.S. Appl. No. 16/774,331, Final Office Action mailed Jul. 22, 2022", 19 pgs.
"U.S. Appl. No. 16/774,331, Final Office Action mailed Nov. 29, 2021", 15 pgs.
"U.S. Appl. No. 16/774,331, Non Final Office Action mailed Mar. 17, 2022", 16 pgs.
"U.S. Appl. No. 16/774,331, Non Final Office Action mailed May 26, 2021", 13 pgs.
"U.S. Appl. No. 16/774,331, Non Final Office Action mailed Dec. 8, 2022", 18 pgs.
"U.S. Appl. No. 16/774,331, Notice of Allowance mailed Jun. 23, 2023", 10 pgs.
"U.S. Appl. No. 16/774,331, Response filed Jan. 31, 2022 to Final Office Action mailed Nov. 29, 2021", 10 pgs.
"U.S. Appl. No. 16/774,331, Response filed Mar. 8, 2023 to Non Final Office Action mailed Dec. 8, 2022", 10 pgs.
"U.S. Appl. No. 16/774,331, Response filed Jun. 17, 2022 to Non Final Office Action mailed Mar. 17, 2022", 10 pgs.
"U.S. Appl. No. 16/774,331, Response filed Aug. 26, 2021 to Non Final Office Action mailed May 26, 2021", 10 pgs.
"U.S. Appl. No. 16/774,331, Response filed Oct. 3, 2022 to Final Office Action mailed Jul. 22, 2022", 10 pgs.
"U.S. Appl. No. 16/774,351, Non Final Office Action mailed Jul. 23, 2020", 18 pgs.
"U.S. Appl. No. 16/774,351, Notice of Allowance mailed Dec. 23, 2020", 10 pgs.
"U.S. Appl. No. 16/774,351, Response filed Oct. 23, 2020 to Non Final Office Action mailed Jul. 23, 2020", 9 pgs.
"U.S. Appl. No. 16/774,371, Non Final Office Action mailed Jul. 30, 2021", 20 pgs.
"U.S. Appl. No. 16/774,371, Notice of Allowance mailed Feb. 9, 2022", 11 pgs.
"U.S. Appl. No. 16/774,371, Response filed Oct. 29, 2021 to Non Final Office Action mailed Jul. 30, 2021", 11 pgs.
"U.S. Appl. No. 17/530,900, Non Final Office Action mailed Nov. 25, 2022", 15 pgs.
"U.S. Appl. No. 17/530,900, Notice of Allowance mailed Mar. 29, 2023", 15 pgs.
"U.S. Appl. No. 17/530,900, Preliminary Amendment filed Dec. 2, 2021", 6 pgs.
"U.S. Appl. No. 17/530,900, Response filed Feb. 27, 2023 to Non Final Office Action mailed Nov. 25, 2022", 9 pgs.
"U.S. Appl. No. 17/541,678, Non Final Office Action mailed Feb. 27, 2023", 18 pgs.
"U.S. Appl. No. 17/541,678, Preliminary Amendment filed Dec. 13, 2021", 6 pgs.
"U.S. Appl. No. 17/541,678, Response filed May 30, 2023 to Non Final Office Action mailed Feb. 27, 2023", 8 pgs.
"U.S. Appl. No. 17/690,285, Final Office Action mailed Sep. 7, 2023", 25 pgs.
"U.S. Appl. No. 17/690,285, Non Final Office Action mailed Mar. 1, 2023", 23 pgs.
"U.S. Appl. No. 17/690,285, Notice of Allowance mailed Nov. 27, 2023", 11 pgs.
"U.S. Appl. No. 17/690,285, Preliminary Amendment filed Mar. 23, 2022", 7 pgs.
"U.S. Appl. No. 17/690,285, Response filed Jun. 1, 2023 to Non Final Office Action mailed Mar. 1, 2023", 10 pgs.
"U.S. Appl. No. 17/690,285, Response filed Nov. 7, 2023 to Final Office Action mailed Sep. 7, 2023", 10 pgs.
"U.S. Appl. No. 17/966,250, Preliminary Amendment filed Oct. 20, 2022", 7 pgs.
"There Really is a Way to Do That", downloaded from: <https://www.marchnetworks.com/intelligent-ip-video-blog/there-really-is-a-way-to-do-that/>, (Jun. 17, 2015).
Ball, Kirstie, "Workplace surveillance: An overview", Labor History 51.1, (2010), 87-106.
Clearinghouse, "Workplace privacy and employee monitoring", Privacy Rights Clearinghouse, (2016).
Costilla-Reyes, Omar, et al., "Analysis of spatio-temporal representations for robust footstep recognition with deep residual neural networks", IEEE transactions on pattern analysis and machine intelligence 41.2, (2018), 13 pgs.
Davis, Marquita V, "Strategies to prevent and detect occupational fraud in small retail businesses", Diss. Walden University, Walden Dissertations and Doctoral Studies Collection, (2019), 128 pgs.
Demirkus, Meltem, et al., "Automated person categorization for video surveillance using soft biometrics", Biometric Technology for Human Identification VII. vol. 7667. SPIE, (2010).
Hampapur, Arun, et al., "S3: The IBM smart surveillance system: From transactional systems to observational systems", IEEE International Conference on Acoustics, Speech and Signal Processing ICASSP'07. vol. 4. IEEE, (2007).
Jain, Anil K, et al., "Biometric authentication: System security and user privacy", Computer 45.11, (2012), 87-92.
Lynch, "Future of Law Enforcement", Google'S. Criminal Justice 35.2 (2020), (2017).
Lyon, David, "Biometrics, identification and surveillance", Bioethics 22.9, (2008), 499-508.
Mazumdar, Suvodeep, et al., "Geo-fence driven crowd-sourcing for Emergencies", ISCRAM, (2015).
Wang, Junjue, et al., "Enabling live video analytics with a scalable and privacy-aware framework", ACM Transactions on Multimedia Computing, Communications, and Applications (TOMM) 14.3s, (2018), 24 pgs.
Zhang, Tan, et al., "The design and implementation of a wireless video surveillance system", Proceedings of the 21st Annual International Conference on Mobile Computing and Networking, (2015).
"European Application Serial No. 20209403.3, Communication Pursuant to Article 94(3) EPC mailed Apr. 24, 2025", 6 pgs.

* cited by examiner

FRICTIONLESS AUTHENTICATION AND MONITORING

RELATED APPLICATIONS

The present application is a Continuation of U.S. application Ser. No. 17/690,285 filed Mar. 9, 2022 and entitled: Frictionless Authentication and Monitoring, which is a Continuation of U.S. application Ser. No. 16/774,371 filed Jan. 28, 2020 and entitled: Frictionless Authentication and Monitoring, which is a Continuation-In Part (CIP) of co-pending U.S. application Ser. No. 16/586,203 filed Sep. 27, 2019 and entitled: "Transaction Terminal Fraud Processing;" application Ser. No. 16,696,837 filed Nov. 26, 2019 and entitled: "Frictionless Fraud Identification and Tracking;" and application Ser. No. 16,724,560 filed Dec. 23, 2019 and entitled: "Frictionless Security Monitoring and Management;" the disclosures of which in their entireties are incorporated by reference herein.

BACKGROUND

Currently, banks spend a lot of time educating, enforcing, and maintaining adequate Know Your Customer (KYC) policies and procedures, which are federally mandated by regulations. This is because most customer identifications/authentications occur using government-issued identification cards, bank cards with Personal Identification Numbers (PINs), passwords, or a combination of these. Additionally, banks typically license software from third-parties that keep registries on individuals that have a history of bad or fraudulent transactions.

Existing authentication techniques are usually manually entered into a teller/banking system and then queried against the bank's core backend system and any third-party systems of the bank. This process not only costs the bank staff to expend time but also requires more effort from the customer, as they are required to carry identification cards and remember PINs and passwords. Furthermore, manual entry and verification of identification cards by bank staff leaves a lot of chance for human error with the potential of costing the bank millions of dollars across its network of branches.

Further, even with the KYC policies and procedures and the various security requirements, nefarious individuals are still able to feign the identity of consumers and illegally withdraw funds from consumer accounts. When such events occur, the consumer is protected and reimbursed by his/her bank while the bank absorbs the loss. However, reimbursement may take a considerable amount of time and the consumer often has the burden or demonstrating and proving that illegal withdrawals occurred, which is very frustrating to the consumers. Moreover, the consumers may need the missing funds to pay bills and there is no compensation to the consumers when loans or advances are needed while waiting on reimbursement to cover any interest or fees associated with those loans or advances.

SUMMARY

In various embodiments, methods and a system for frictionless authentication and monitoring are presented.

According to an embodiment, a method for frictionless authentication and monitoring is presented. An individual is authenticated within an establishment to a customer identity. Data associated with the customer identity is aggregated from a plurality of sources as aggregated customer data. Video of the individual is captured within the establishment. Actions and behaviors of the individual are identified from the video. A transaction request associated with a transaction being performed by the individual within the establishment is detected. A determination is made as to whether to intervene in the transaction before the transaction completes based on the customer identity, the actions, the behaviors, and the aggregated customer data.

DETAILED DESCRIPTION

Figure 1:
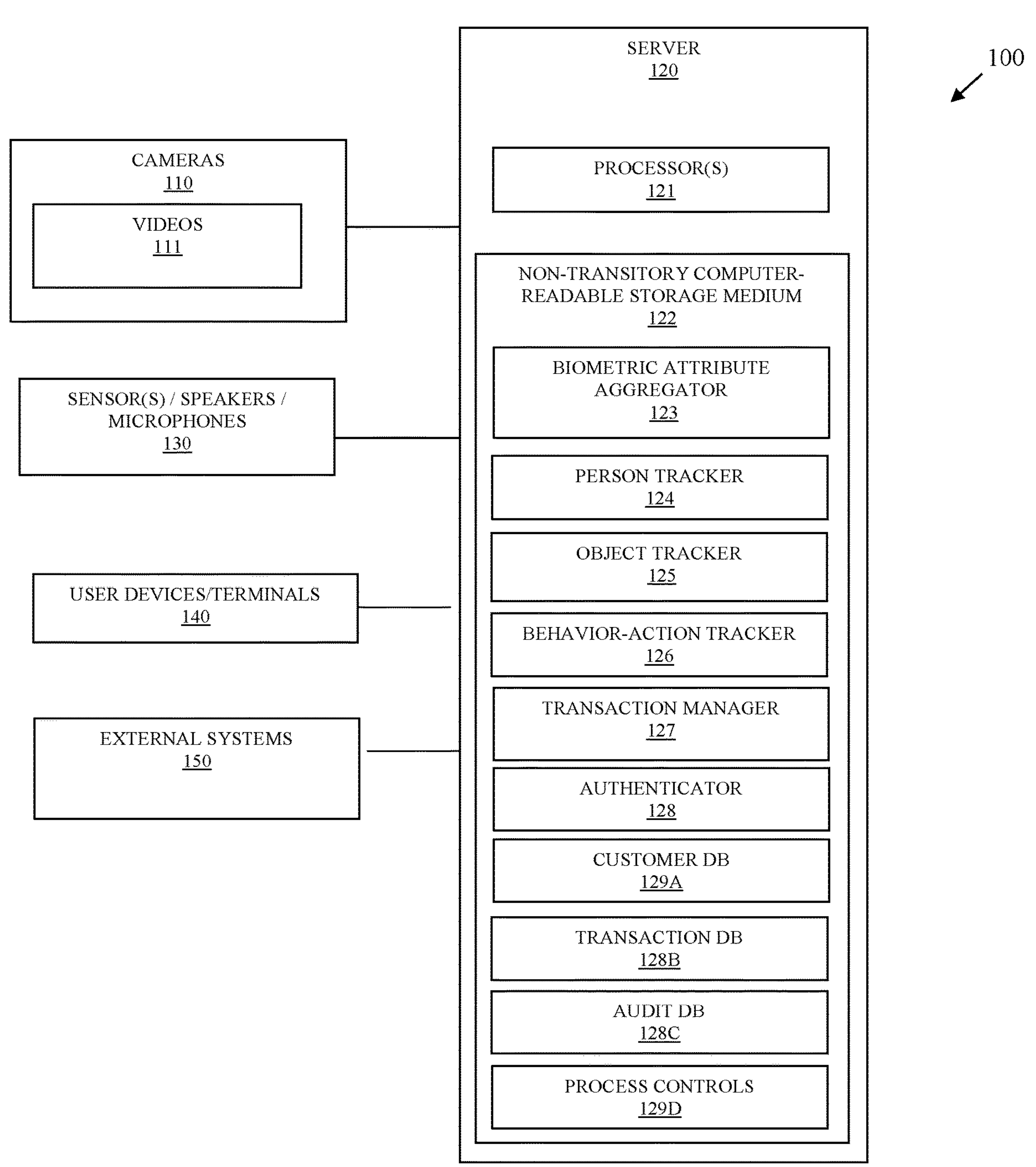
FIG. 1 is a diagram of a system for frictionless authentication and monitoring, according to an example embodiment.

FIG. 1 is a diagram of a system 100 for frictionless authentication and monitoring according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of frictionless authentication and monitoring, presented herein and below.

System 100 provides mechanism by which a customer entering an establishment can be biometric authenticated from a variety of biometric sensors and/or captured video. The authenticated customer is linked to a known identity and data retained by or available to the establishment and associated with the known identity is obtained from the appropriate data sources. Behaviors and actions of the customer are monitored using the video while the customer remains within the establishment. Any staff member of the enterprise that interacts with the customer is monitored from the video. During any customer-initiated transaction or staff-initiated transaction, the authenticated identity and linked data are provided without any further interaction being required or verification being required by the customer or the staff member. Suspect actions, behaviors, and/or transaction details are evaluated in view of the linked data and automated responses or actions are processed for the transaction. The authentication and monitoring of the customer, the staff, and the transaction are completely frictionless and audit data is retained for purposes of identifying fraud and complying with KYC regulations. Any missed fraud subsequently identified from the transactions are flagged in the audit data to learn how to detect such fraud in subsequent transactions and/or prevent a customer associated with such fraud from perpetrating that fraud on the establishment again or on a different establishment.

As used herein and below, the terms "user," "personnel," "actor," "person," "individual," "staff member," "customer," "consumer," and "subject" may be used interchangeably and synonymously. The terms refer to an individual detected within a monitored area of an establishment.

A "business process," as used herein, refers to a set of predefined actions required in performance of a predefined business procedure/process of an establishment. A "set of predefined actions" may also be referred to herein as "activities."

An "object" refers to a secure asset, a non-secure asset, and/or a structure located within the establishment. The object may include drawers, computers, keys, cash, checks, tables, security panels, chairs, windows, notary stamps, doors, documents, terminals, countertops, shelving, money, checks, safety deposit boxes, items being sold within the establishment, etc. that are being monitored within the image frames of one or more videos provided in video feeds.

A "biometric feature," or a "biometric attribute" may be used interchangeably and synonymously herein and refers to sensor captured data, audio derived characteristics from audio, and/or image derived characteristics from images, which uniquely exhibits a characteristic of an individual. In some cases, a single biometric attribute may be sufficient to uniquely identify an individual. In some cases, multiple biometric attributes are used to unique identify an individual.

System 100 includes a plurality of cameras 110 that capture time-stamped videos 111 of persons and objects outside and on a premise of an establishment and within the establishment. System 100 includes user devices/terminals 140 used to process transactions associated with the establishment and one or more external systems 150 that are external and remote to an establishment's operation systems. System 100 also includes sensors, speakers, and microphones 130 dispersed throughout the establishment and/or integrated into other devices, such as terminals 140.

Moreover, system 100 also includes server 120. Server 120 includes executable instructions that execute on one or more hardware processors 121 of server 120 from a non-transitory computer-readable storage medium 122 as: biometric attribute aggregator 123, person tracker 124, object tracker 125, behavior-action tracker 126, transaction manager 127, and authenticator 128.

Non-transitory computer-readable-storage medium 122 of server 120 also includes: customer database (DB) 129A, transaction DB 129B, audit DB 129C, and process controls 129D.

Process controls 129D represents a data structure comprising and embodying business rules associated with predefined business actions or tasks required by an establishment during performance of transactions and customer assistance. The data structure includes statements of area identifiers, asset/object identifiers, action identifiers, behavior identifiers, security role identifiers for security roles and responsibilities, transaction data identifiers for types of transaction data required for any given task (when a transaction is taking place or is a monitored set of activities), task identifiers that identify specific tasks, and conditions that defines rules. Each rule identifying a task and required actions, behaviors, and any transaction information, audit information, or business operation information for that task. Tasks can be required, permissible but not required, and/or impermissible/prohibited. The sequence of the tasks may also be defined within the conditions for the rules. Each rule may also include a resource identifier or a processing action that is to be processed when a given rule is violated. The resource associated with the resource identifier may be an automated application, external system 150, an internal establishment system, or an electronic contact address of an individual.

A given "task" may also be referred to as a set of predefined activities or activities.

It is to be noted that there may be multiple servers 120, such that the different elements 123-129A-D may execute on a same server 120 or multiple different servers 120 networked together within a cloud processing environment.

Cameras 110 are preconfigured to capture videos 111 of areas that are inside and outside the establishment based on the field-of-view of the lenses of cameras 110. Some of cameras 110 may capture video 111 representing portions of a different area than a different one of the cameras 110 captures video 111 for. That is, each video 111 can include frames that may overlap multiple ones of the defined areas covered in the field-of-view of a different camera 110. Some area identifiers may be associated with zones that are subject to enhanced security policies.

In an embodiment, the cameras 110 can be situated at different angles and heights within the areas where they are located. Some cameras 110 may be at waist level, chest level, or head level to an average sized person and directed in different directions upward or downward slightly for purposes of capturing the eyes of individuals within the room. Additionally, there may be one or more overhead cameras 110 both inside and outside the establishment. Some cameras 110 may be specifically calibrated to capture eyes and faces of the individuals. Some cameras 110 may be of higher quality or of a different type than other cameras 110.

Initially, cameras 110 are situated in locations throughout the establishment and some of the one or more cameras 110 may situated on the outside of the establishment to capture the egress and ingress point of the establishment and optionally to capture a parking lot associated with the establishment Each camera lens configured to cover one or more predefined areas both inside and outside the establishment.

Furthermore, metadata is assigned to each camera 110 to include a unique camera identifier, a location identifier (representing the physical location that camera 110 is situated), and one or more area identifiers (representing the predefined areas that the lens and field-of-view of camera 110 captures in the video 111—again, some area identifiers are associated with zones subject to increased security policies as may be defined in process controls 129D).

Terminals/user devices 140 comprise processing devices that are operated by employees and/or customers of the establishment during transactions, when performing electronic business operations, and/or when obtaining information or providing information. Transactions may comprise processing actions initiated by the employees in performance of a portion of a task associated with the establishment. Devices 140 may also include user-operated mobile devices, such as phones, tablets, and/or wearable processing devices. In an embodiment, terminals 140 include Self-Service Terminals (SSTs), Automated Teller Machines (ATMs), teller-operated Point-of-Sale (POS) terminals, mobile phones, tablets, and/or wearable processing devices.

Terminals/use devices 140 include processors and non-transitory computer-readable storage media having executable instructions associated with transaction agents. These transaction agents interact with transaction manager 127 during transaction processing and may provide a variety of transaction details to transaction manager 127 regarding a current in-progress or initiated transaction.

Person tracker 124 analyzes pixels in video frames of video feeds 111 and uses a bounding box or region of interest within the pixels to track locations of the individuals and extremities (arms, hands) of the individuals within a known area of the establishment based on the area identifiers associated with cameras 110.

Object tracker 125 monitors the structures and assets within the establishment via bounding boxes or regions of interest within pixels of the image frames for the video feeds 111.

Behavior-action tracker 127 utilizes the bounding boxes associated with each individual and the objects to perform more detailed pixel analysis on facial features of the individuals and identify behaviors identified by specific behavior identifiers. Moreover, location information within the pixels for the bounding boxes of the individuals and the objects are used by behavior-action tracker 127 to identify actions that corresponding to action identifiers.

Metadata associated with frames of the video 111 permit transaction manager 127 to identify locations within an establishment of each person/individual provided by person tracker 124 and each object provided by object tracker 125. Locations within the establishment associated with specific zones are identified as are object identifiers that correspond to secure assets. Moreover, transaction information identifies locations of terminals 140.

Aggregator 123 provides specific pixel features of specific areas within a bounding box for a person that is identified by person tracker 124, the specific pixel features associated with tracked biometric features of customers and staff members of the establishment. Furthermore, aggregator 123 evaluates behaviors in greater detail as provided and identified by behavior-action tracker 126 for tracked biometric features associated with behaviors. Moreover, aggregator evaluates sensor data provided by sensors 130. The sensor data can include, by way of example only, facial scans, retina scans, fingerprint scans, digit length scans, palm vein scans, audio samples, and others. The behavior biometric features may include gait of an individual, length of a gait, facial expressions, and the like.

Aggregator 123 assembles each biometric feature detectable for a given individual starting as soon as an individual is detected by person tracker 124 within the establishment. Moreover, aggregator 123 continues to gather biometric features as they are discovered for the individual. A person tracker identifier provided by person tracker and the biometric features are provided by aggregator 123 to authenticator 128. As more biometric features are discovered by aggregator 123, they are immediately provided to authenticator 128. Authenticator 128 maintains the person tracker identifier and the biometric features and generates a current score for the biometric features, which is then compared against known scores assigned to known customers and their identities. When a given score is within a predefined threshold of confidence, a customer identity match is made. The customer identity is assigned to the person tracker identifier by authenticator 128 and passed to transaction manager 127.

Transaction manager 127 uses the customer identity to access customer DB 129A and transaction DB 128B and obtain all customer records/data associated with the customer identity. This is all linked together and associated with the person tracker identifier. Manager 127 also receives action and behavior identifiers for detected actions for the person tracker identifier from behavior-action tracker 126 along with object identifiers from object tracker 125. Additionally, any staff member detected in the video 111 is identified in a similar manner as the customer was identified and such staff identities are retained by manager 127. Furthermore, transaction information is provided from terminals 140 during any transaction being performed by the customer or by staff members assisting the customer.

Manager 127 evaluates process controls 129D using the identifiers and identities to evaluate the conditions in the business rules of the controls 129D to identify actions that may or may not be required while the customer moves about the establishment (journeys). Controls 129D may also identify conditions and rules associated with transaction types and transaction thresholds.

Manager 127 processes automated actions as directed by controls 129D and associates, tags, and links the actions, behaviors, identities, and transaction data for the customer visit in audit DB 128C.

A variety of beneficial processing can be achieved by system 100 some of which are now discussed for purposes of illustrating embodiments presented herein.

A customer may approach an SST/ATM 140 and through aggregator 123 and authenticator 128, manager 127 sends a transaction agent on ATM 140 an authenticated code and link to the customer's account. The customer is presented with an account message identifying the customer and asking what transaction the customer wants to perform. The customer may then perform a withdraw or a deposit by selecting an appropriate one of the customer's accounts and identifying the transaction details. This occurs in a completely frictionless manner and without the customer inserting a bank card or providing a PIN or password. As soon as the customer is detected as moving away from ATM 140, manager 127 instructs the transaction agent to cancel the transaction or remove any customer details from the screen of terminal 140.

Any transaction performed can be evaluated in real-time by manager 127 based on actions and behaviors of the customer, a history of known transactions for the customer, the customer's account status, actions and behaviors of any staff assisting the customer, and when based on conditions in controls 129D a suspicion is detected, manager 127 may instruct transaction agent on terminal 140 to: request a different staff member to come review the present transaction, place a hold on the transaction for review, place a hold on the customer's account, and/or add flags to customer's account for monitoring on future transactions or to a staff member's employee file for monitoring on subsequent transactions.

Any fraud can cause manager 127 through controls 129D to raise an alert to internal and external systems 150. In situations of violence or robbery's silent alarms to external authority systems can be raised by manager 127.

The linked data associated with customer visits and any staff interaction can be retained within the audit DB 128C. If a fraud was determined to have been committed on a known day and/or with a known transaction, the audit DB 128C can be inspected for determining how it could have been detected when it was in progress. The process controls 129D are updated accordingly such that any subsequent transaction having that type of fraud will be detected and enforced in real time by manager 127.

Audit DB 128C includes a link to the video 111 associated with a customer visit to the establishment. The video is indexed to the linked audit data associated with the visit. So, any questionable behavior may be clicked from the audit data and the corresponding portion of the video associated with the questionable behavior is played for a reviewer.

Furthermore, system 100 may share audit DBs 128C across different establishment, such that fraudulent actors or actions/behaviors can be detected and prevent in real time.

System 100 provides a holistic approach to authentication and a customer's visit to an establishment that monitors all data associated with the customer in an integrated fashion that is frictionless (requiring no manual operations or actions). Transaction history and account information are integrated with the customer identity and evaluated as a customer is visiting and performing transactions within an establishment. This improves security, reduces the burden of the establishment, and improves customer satisfaction.

In an embodiment, customers may affirmatively provide a face, finger, palm, or other biometric feature upon ingress to the establishment in which case aggregator 123 does not need to continually attempt to collect as many biometric features as needed by authenticator 128 to authenticate the customer.

In an embodiment, manager 127 listens for keywords spoken an individual (customer and/or staff member) captured from microphones 130. When a keyword associated with distress is spoken, compliance manager 127 raises a silent alarm and may notify one or more other individuals associated with the establishment.

In an embodiment, manager 127 may utilize speakers/microphones 130 and/or speakers/microphone 153 with a speech-to-text and text-to-speech functions allowing manager 127 to interactively engage the customer and/or staff member to provide natural language assistance with transactions and feedback regarding the issues associated with transaction processing.

In an embodiment, manager 127 maintains metrics associated with employees performing tasks (including transactions), such as time associated with a given task as a whole, time associated with a given action of a task, time associated with a given set of actions of a task, etc. Manager 127 may then provide an interface for searching, reporting, and mining the metrics. This can be used for continuous process improvements associated with the tasks, non-reputable evidence of non-compliance infractions associated with a given employee, and/or for employee evaluation and discipline.

The above-noted embodiments and other embodiments are now discussed with reference to FIGS. 2-4.

Figure 2:
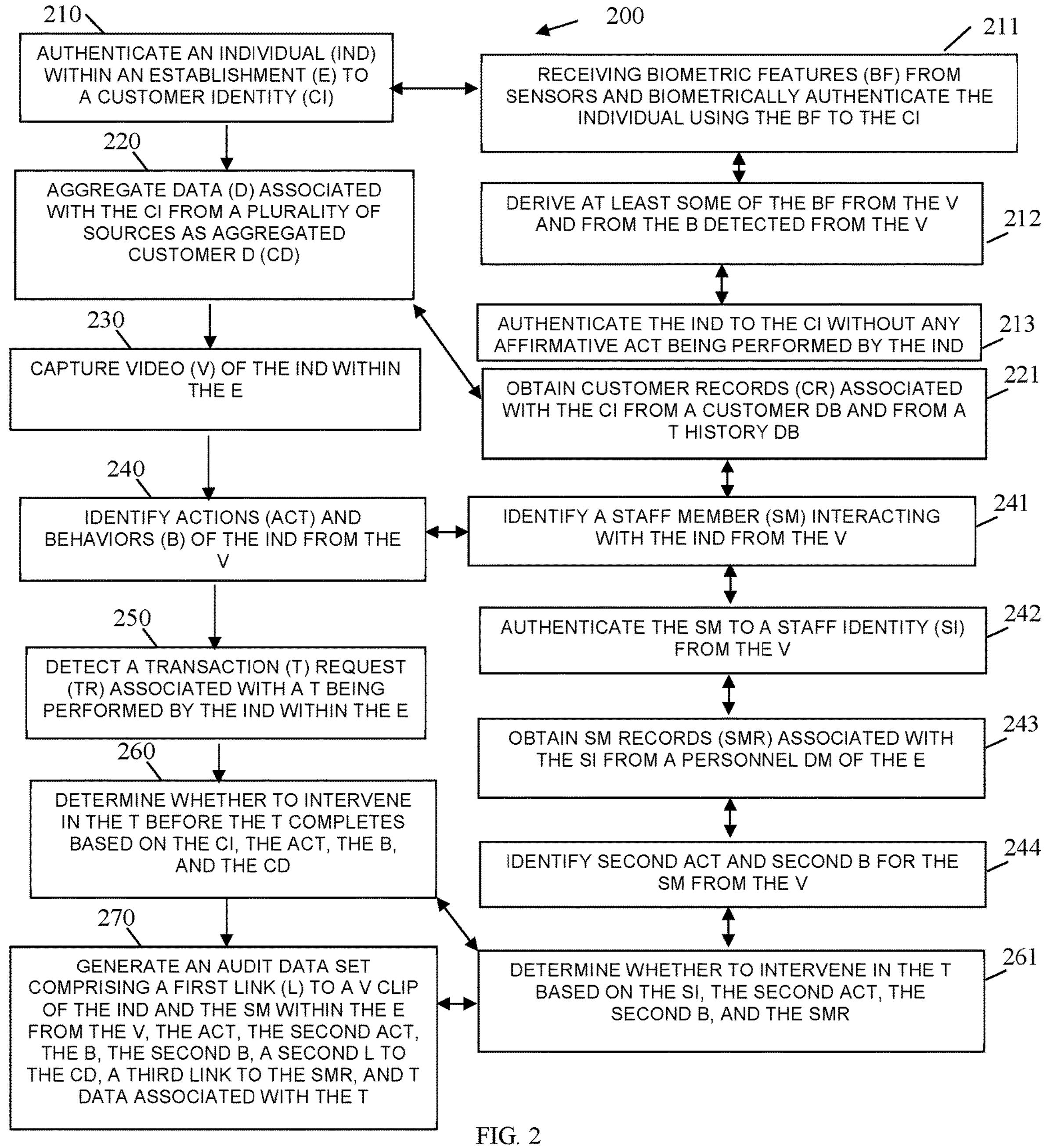
FIG. 2 is a diagram of a method for frictionless authentication and monitoring, according to an example embodiment.

FIG. 2 is a diagram of a method 200 for frictionless authentication and monitoring, according to an example embodiment. The software module(s) that implements the method 200 is referred to as a "dual frictionless authentication monitor." The frictionless authentication monitor is implemented as executable instructions programmed and residing within memory and/or a non-transitory computer-readable (processor-readable) storage medium and executed by one or more processors of a device. The processor(s) of the device that executes the frictionless authentication monitor are specifically configured and programmed to process the frictionless authentication monitor. The frictionless authentication monitor may have access to one or more network connections during its processing. The network connections can be wired, wireless, or a combination of wired and wireless.

In an embodiment, the device that executes the frictionless authentication monitor is server 120. In an embodiment, server 120 is a cloud-based server, a local-area network (LAN)-based server, or a wide-area network (WAN) server.

In an embodiment, the frictionless authentication monitor is all or some combination of: 123-128.

At 210, the frictionless authentication monitor authenticates an individual within an establishment to a customer identity.

In an embodiment, at 211, the frictionless authentication monitor receives biometric features from sensors 130 and the frictionless authentication monitor biometrically authenticates the individual using the biometric features to the customer identity.

In an embodiment of 211 and at 212, the frictionless authentication monitor derives at least some of the biometric features from captured video and from the behaviors detected from the video of the individual.

In an embodiment of 212 and at 213, the frictionless authentication monitor authenticates the individual to the customer identity without any affirmative action being performed by the individual.

At 220, the frictionless authentication monitor aggregates data associated with the customer identity from a plurality of data sources as aggregated customer data.

In an embodiment, at 221, the frictionless authentication monitor obtains customer records associated with the customer identity from a customer database and from a transaction history database of the establishment.

At 230, the frictionless authentication monitor captures video of the individual within the establishment. It is noted that the video may have been captured back at 210 and as soon as the individual entered the establishment.

At 240, the frictionless authentication monitor identifies actions and behaviors of the individual from the video.

In an embodiment of 221 and 240, at 241, the frictionless authentication monitor identifies a staff member interacting with the individual from the video.

In an embodiment of 241 and at 242, the frictionless authentication monitor authenticates the staff member to a staff identity from the video and/or from biometric sensors 130.

In an embodiment of 242 and at 243, the frictionless authentication monitor obtains staff member records associated with the staff identity from a personnel database of the establishment.

In an embodiment of 243 and at 244, the frictionless authentication monitor identifies second actions and second behaviors for the staff member from the video.

At 250, the frictionless authentication monitor detects a transaction request associated with a transaction being performed by the individual within the establishment. It is noted that a staff member may be operating a terminal to conduct the transaction, or the individual may be operating an SST/ATM to conduct the transaction.

At 260, the frictionless authentication monitor determines whether to intervene in the transaction before the transaction completes based on the customer identity, the actions, the behaviors, and the aggregated customer data. This can be done utilizing the process controls 129D as described above.

In an embodiment of 244 and 260, at 261, the frictionless authentication monitor determines whether to intervene based on also considering and evaluating the staff member identity, the second actions of the staff member, the second behaviors of the staff member, and the staff member records.

In an embodiment, at 270, the frictionless authentication monitor generates an audit data set comprising: the customer identity, date and time stamps, a first link to a video clip of the individual performing the actions, transaction, and behaviors within the establishment (the video clip taken from the video), the actions, the behaviors, the second actions, the second behaviors, the staff member identity, a second link to the aggregated customer data, and a third link to the staff member records.

Figure 3:
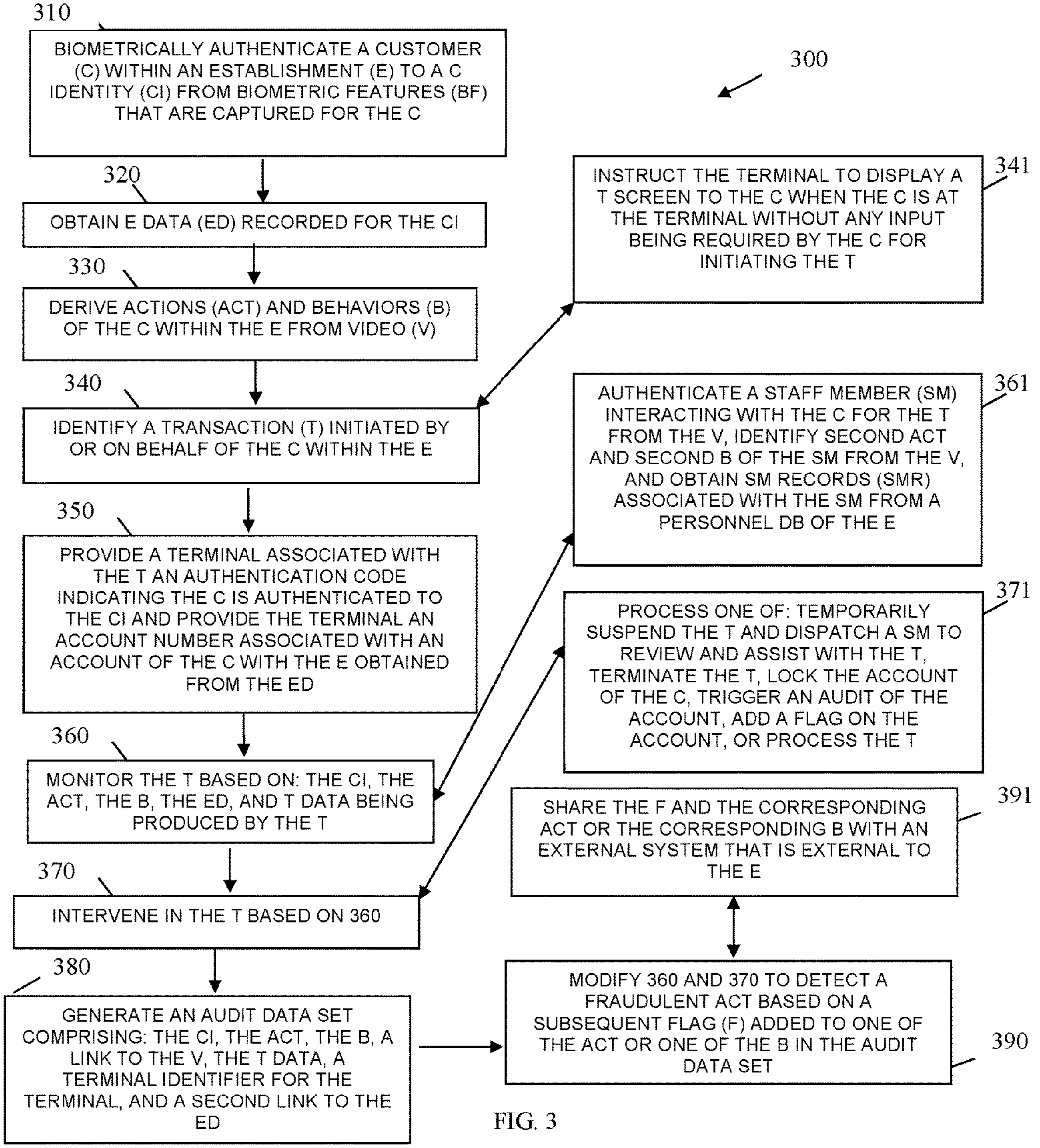
FIG. 3 is a diagram of another method for frictionless authentication and monitoring, according to an example embodiment.

FIG. 3 is a diagram of another method 300 for frictionless authentication and monitoring, according to an example embodiment. The software module(s) that implements the method 300 is referred to as an "authentication context manager." The authentication context manager is implemented as executable instructions programmed and residing within memory and/or a non-transitory computer-readable (processor-readable) storage medium and executed by one or more processors of a device. The processors that execute the authentication context manager are specifically configured and programmed to process authentication context manager. The authentication context manager may have access to one or more network connections during its processing. The network connections can be wired, wireless, or a combination of wired and wireless.

In an embodiment, the device that executes the authentication context manager is the server 120. In an embodiment, the server 120 is a cloud processing environment, a LAN server, or a WAN server.

In an embodiment, the authentication context manager is all of or some combination of: 123-128 and/or the method 300.

The authentication context manager presents another and, in some ways, enhanced processing perspective of the method 200 discussed above.

At 310, the authentication context manager biometrically authenticates a customer within an establishment to a customer identity from biometric features captured for the customer. In an embodiment, some of the biometric features may be obtained from video captured as soon as the customer enters the establishment.

At 320, the authentication context manager obtains establishment data recorded or known for the customer identity. This can be aggregated from a plurality of internal establishment sources or external sources that are external to the establishment.

At 330, the authentication context manager derives actions and behaviors of the customer within the establishment from video captured within the establishment.

At 340, the authentication context manager identifies a transaction initiated by or on behalf of the customer within the establishment.

In an embodiment, at 341, the authentication context manager instructs a terminal processing the transaction to display a transaction screen to the customer when the customer is at the terminal without any input being required by the customer for initiating the transaction.

At 350, the authentication context manager provides the terminal associated with the transaction an authentication code indicating that the customer is already authenticated to the customer identity. The authentication context manager also provides an account number associated with an account of the customer with the establishment and which was obtained from the establishment data.

At 360, the authentication context manager monitors the transaction based on the customer identity, the actions, the behaviors, the establishment data, and transaction data that is being produced during processing of the transaction.

In an embodiment, at 361, the authentication context manager authenticates a staff member interacting with the customer for the transaction from the video, identifies second actions and second behaviors of the staff member from the video, and obtains staff member records associated with the staff member from a personnel database of the establishment.

At 370, the authentication context manager intervenes in the transaction before the transaction completes based on the monitoring at 360 as defined in process controls 129D.

In an embodiment, at 371, the authentication context manager processes one of based on the process controls 129D and the monitoring at 360: temporarily suspends the transaction and dispatches a staff member to review and/or assist with the transaction, terminate the transaction preventing the transaction from being fully processed, lock the account of the customer, trigger an audit of the account, add a flag on the account, or process the transaction normally to completion.

In an embodiment, at 380, the authentication context manager generates an audit data set comprising: the customer identity, the actions, the behaviors, a link to the video, the transaction data for the transaction, a terminal identifier for the terminal that processed the transaction, and a second link to the establishment data associated with the customer.

In an embodiment of 380 and at 390, the authentication context manager modifies 360 and 370 to detect a fraudulent action based on a subsequent flag added to one of the actions of the customer and/or one of the behaviors of the customer. The flag added to the audit data set after the transaction completed. This can be done by changing the corresponding processing control 129D and its rules to identify the corresponding action and/or behavior to be associated with the fraudulent action.

In an embodiment of 390 and at 391, the authentication context manager shares the fraudulent action and the corresponding action or the corresponding behavior with an external system 350 that is external to the establishment and the systems of the establishment.

Figure 4:
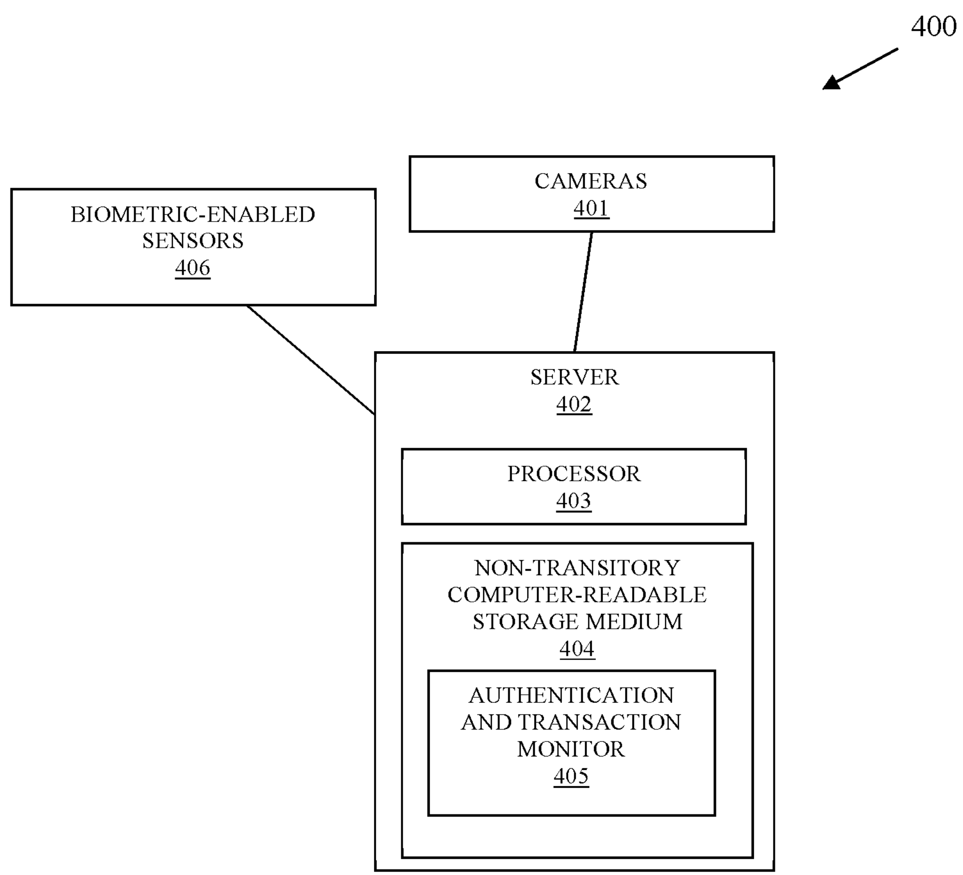
FIG. 4 is a diagram of another system for frictionless authentication and monitoring, according to an example embodiment.

FIG. 4 is a diagram of a system 400 for frictionless authentication and monitoring, according to an example embodiment. The system 400 includes a variety of hardware components and software components. The software components of the system 400 are programmed and reside within memory and/or a non-transitory computer-readable medium and execute on one or more processors of the system 400. The system 400 communicates over one or more networks, which can be wired, wireless, or a combination of wired and wireless.

In an embodiment, the system 400 implements, inter alia, the processing described above with the FIGS. 1-3.

The system 400 includes a plurality cameras 401, a server 402, and biometric-enabled sensors 406. The server 402 includes at least one hardware processor 403, a non-transitory computer-readable storage medium 404 having executable instructions representing an authentication and transaction monitor 405.

The authentication and transaction monitor 405 when executed from the non-transitory computer-readable storage medium 404 on the processor 403 is configured to cause the processor 403 to perform processing comprising: 1) authenticating a customer to a customer identity within the establishment from one of or from both of the videos provided from the cameras 401 and sensor data provided from the biometric-enabled sensors 406; 2) aggregating customer data for the customer from a variety of establishment sources based on the customer identity; 3) monitoring actions and behaviors of the customer while the customer remains within the establishment from the videos; 4) intervening during any transactions conducted by or on behalf of the customer within the establishment based on evaluation of the actions, the behaviors, and the customer data; and 5) generating an audit data set representing a time the customer remained within the establishment comprising: a data and time stamp, the customer identity, a link to a video clip derived from the videos and representing the actions and the behaviors of the customer within the establishment, the actions, the behaviors, a second link to the customer data, and any transaction data associated with the transactions that the customer performed within the establishment.

In an embodiment, the authentication and transaction monitor 405 when executed from the non-transitory computer-readable storage medium 404 on the processor 403 is configured to further cause the processor 403 to perform additional processing comprising one or more of: 6) authenticating one or more staff members to staff member identities when the staff members are detected as interacting with the customer within the establishment as identified from the videos that are provided by the cameras 401; 7) obtaining staff member records for the staff members from a personnel database of the establishment based on the staff member identities; 8) monitoring second actions and second behaviors of the staff members from the videos; 9) intervening during the transactions based on evaluation of the second actions, the second behaviors, the staff member records, and the transaction data; and 10) adding to the audit data: the staff member identities, the second actions, the second behaviors, and a third link to the staff member records.

In an embodiment, the authentication and transaction monitor 405 is all of or some combination of: 123-128, the method 200, and/or the method 300.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A server, comprising:

a processor; and a non-transitory computer-readable storage medium having instructions that when executed by the processor cause the processor to perform operations comprising:

authenticating an individual to a customer identity using frictionless data;

aggregating data associated with the customer identity from a plurality of data sources;

identifying at least one action or at least one behavior of the individual from video analysis;

detecting a transaction request associated with the individual;

determining whether to intervene in a transaction based on one or more of the customer identity, the at least one action, the at least one behavior, and the aggregated data;

providing, by a person tracker, specific pixel features of specific areas within a bounding box for the individual, the specific pixel features associated with tracked biometric features of the individual; and utilizing, by a behavior-action tracker, the bounding box to perform more detailed pixel analysis on facial features of the individual and identify the at least one behavior identified by a specific behavior identifier; and evaluating, by a transaction manager, process controls using identifiers and identities of the individual to evaluate conditions in business rules of the process controls to identify actions that are required, permissible, or impermissible while the individual moves about an establishment, and processing automated actions as directed by the process controls.

2. The server of claim 1, wherein authenticating further includes biometrically authenticating using features of the individual derived the from video analysis.

3. The server of claim 1, wherein aggregating further includes obtaining customer records associated with the individual from the plurality of data sources.

4. The server of claim 1, wherein identifying further includes identifying a staff member interacting with the individual from the video analysis.

5. The server of claim 4, wherein identifying further includes authenticating the staff member to a staff member identity.

6. The server of claim 1, wherein detecting further includes identifying a transaction object in a video associated with a transaction device.

7. The server of claim 1, wherein determining further includes evaluating transaction data against predefined rules in process controls.

8. A method comprising:

biometrically authenticating a customer to a customer identity using frictionless data;

obtaining establishment data for the customer identity;

deriving at least one action or at least one behavior of the customer from video analysis;

identifying a transaction initiated by or for the customer;

providing transaction authentication for the customer to a terminal associated with the transaction;

monitoring and intervening in the transaction based on one or more of the customer identity, the at least one action, the at least one behavior, the establishment data, and transaction data for the transaction;

analyzing pixels in video frames of video feeds and using a bounding box or region of interest within the pixels to track locations of the customer and extremities of the customer with a known area of an establishment based on area identifiers associated with cameras that provide the video feeds; and assembling, by an aggregator, each biometric feature detectable for the customer starting as soon as the customer is detected within the establishment, generating a current score for the assembled biometric features, comparing the current score against known scores assigned to known customers and their identities, and assigning a customer identity match to the customer when the current score is within a predefined threshold of confidence.

9. The method of claim 8, further comprising:

generating an audit data set linking customer data, video, and the transaction data.

10. The method of claim 8, further comprising:

detecting a fraudulent action based on flagged behaviors.

11. The method of claim 8, wherein deriving further includes tracking an object identified as the customer across images frames of video and associating at least one action identifier or at least behavior identifier with the customer.

12. The method of claim 8, wherein identifying further includes detecting a particular action identifier for the at least one action that is associated with a transaction initiation action.

13. The method of claim 8, wherein identifying further includes detecting a terminal object in video representing the terminal.

14. The method of claim 8, wherein providing further includes sending an authentication code and an account number associated with the customer to the terminal.

15. The method of claim 8, wherein monitoring and intervening further includes authenticating and tracking a staff member interacting with the customer from video associated with the transaction.

16. A method comprising:

receiving, by a terminal, an authentication code from a server, wherein the authentication code identifies a customer and an account of the customer without customer input provided to the terminal;

displaying, by the terminal, a transaction screen to initiate a transaction for the customer based on the authentication code;

processing, by the terminal, the transaction;

sending, by the terminal, transaction data to the server during the transaction;

receiving, by the terminal, an intervention instruction from the server when the server determines an intervention is necessary based on at least one of the customer linked to the account or the transaction data;

modifying, by the terminal, the transaction based on the intervention instruction;

wherein the terminal comprises processing devices that are operated by employees and customers of an establishment during transactions responsive to performing electronic operations, and responsive to obtaining information or providing information;

wherein particular transactions comprise processing actions initiated by the employees in performance of a portion of a task associated with the establishment; and storing, by the terminal, audit data that associates and tags at least one action, a customer identity, and the transaction data for a customer visit, and linking the audit data to a video indexed to the customer visit such that a reviewer can access a corresponding portion of the video associated with any questionable behavior directly from the audit data.

17. The method of claim 16, wherein displaying further includes presenting account information for the customer without requiring customer authentication input at the terminal.

18. The method of claim 16, wherein processing further includes capturing biometric data of the customer during the transaction.

19. The method of claim 16, wherein modifying further includes one of: suspending the transaction, terminating the transaction, or requesting additional verification from the customer.

20. The method of claim 16, further comprising:

updating account information received from the server based on the intervention instruction.

* * * * *